US012431069B2

(12) United States Patent
Tang et al.

(10) Patent No.: US 12,431,069 B2
(45) Date of Patent: Sep. 30, 2025

(54) LIGHT EMITTING DIODE (LED) DISPLAY DRIVER UTILIZING PING PONG LINE BUFFER TO REDUCE HARDWARE COSTS AND LATENCY

(71) Applicant: SCT LTD., Grand Cayman (KY)

(72) Inventors: Shang-Kuan Tang, Milpitas, CA (US); Brandon Li, Milpitas, CA (US); Eric Li, Milpitas, CA (US)

(73) Assignee: SCT LTD., Grand Cayman (KY)

( * ) Notice: Subject to any disclaimer, the term of this patent is extended or adjusted under 35 U.S.C. 154(b) by 0 days.

(21) Appl. No.: 18/494,405

(22) Filed: Oct. 25, 2023

(65) Prior Publication Data

US 2024/0153446 A1 May 9, 2024

Related U.S. Application Data

(60) Provisional application No. 63/381,856, filed on Nov. 1, 2022.

(51) Int. Cl.
*G09G 3/32* (2016.01)

(52) U.S. Cl.
CPC ........... *G09G 3/32* (2013.01); *G09G 2310/08* (2013.01); *G09G 2320/0247* (2013.01); *G09G 2360/18* (2013.01)

(58) Field of Classification Search
CPC .......... G09G 3/30; G09G 3/32; G09G 3/3208; G09G 3/3216; G09G 3/3225; G09G 3/3233; G09G 3/3241; G09G 3/325; G09G 3/3258; G09G 3/3266; G09G 3/3275; G09G 3/3283; G09G 3/3291; G09G 2360/18
USPC ...................................................... 345/76–83
See application file for complete search history.

(56) References Cited

U.S. PATENT DOCUMENTS

2005/0226085 A1* 10/2005 Yeh ........................ G09G 5/001 365/230.05
2006/0001632 A1* 1/2006 Katagawa ............ G09G 3/3611 345/98
2006/0022987 A1* 2/2006 Rai ........................... G06T 1/60 345/571
2009/0051689 A1* 2/2009 Honme ................. G06T 11/203 345/443
2009/0309880 A1* 12/2009 Chen ..................... G06T 11/203 345/441
2011/0032262 A1* 2/2011 Furusawa ................. G06T 1/60 345/545
2014/0002468 A1* 1/2014 Sung ...................... G09G 5/399 345/536

(Continued)

*Primary Examiner* — Ke Xiao
*Assistant Examiner* — Nelson Lam
(74) *Attorney, Agent, or Firm* — NKL Law; Allen Xue

(57) ABSTRACT

A method and an apparatus for operating an LED display are provided. The method includes: storing Nth scan line data in a line buffer; storing the Nth scan line data in a frame buffer; displaying the Nth scan line data stored in the line buffer; during the displaying of the Nth scan line data stored in the line buffer, storing (N+1)th scan line data in the line buffer; storing the (N+1)th scan line data in the frame buffer; displaying the (N+1)th scan line data stored in the line buffer; repeating the above steps until (N+M)th scan line data stored in the line buffer is displayed; and displaying scan line data stored in the frame buffer from the Nth scan line data to the (N+M)th scan line data.

10 Claims, 7 Drawing Sheets

(56) References Cited

U.S. PATENT DOCUMENTS

| | | | | |
|---|---|---|---|---|
| 2014/0118300 | A1* | 5/2014 | Shiraishi | G09G 5/395 345/545 |
| 2015/0170578 | A1* | 6/2015 | Choi | G09G 3/3266 345/212 |
| 2016/0086565 | A1* | 3/2016 | Ryu | G09G 5/003 345/211 |

* cited by examiner

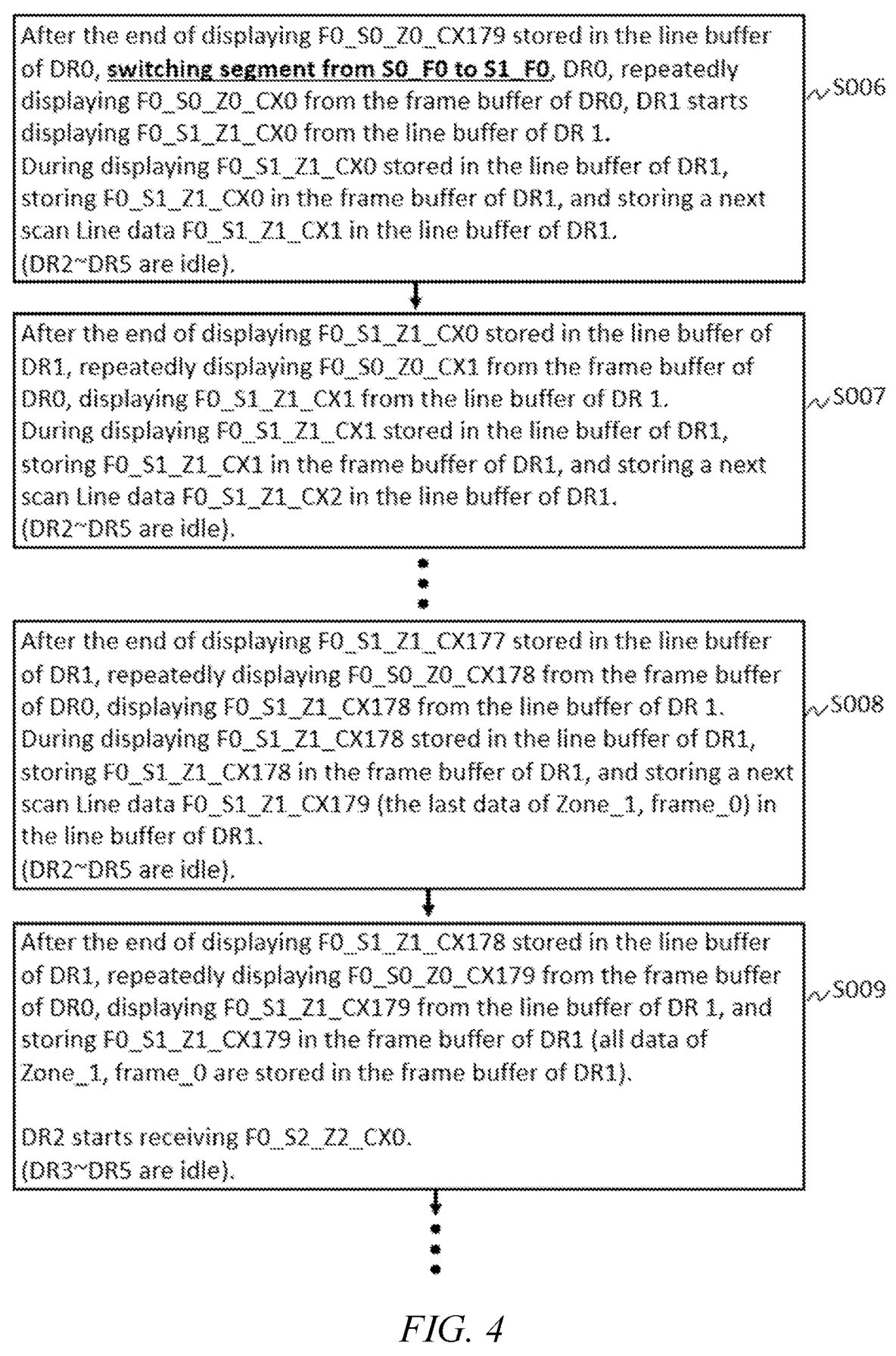

After the end of displaying F0_S0_Z0_CX179 stored in the line buffer of DR0, switching segment from S0_F0 to S1_F0, DR0, repeatedly displaying F0_S0_Z0_CX0 from the frame buffer of DR0, DR1 starts displaying F0_S1_Z1_CX0 from the line buffer of DR 1.
During displaying F0_S1_Z1_CX0 stored in the line buffer of DR1, storing F0_S1_Z1_CX0 in the frame buffer of DR1, and storing a next scan Line data F0_S1_Z1_CX1 in the line buffer of DR1.
(DR2~DR5 are idle). S006

↓

After the end of displaying F0_S1_Z1_CX0 stored in the line buffer of DR1, repeatedly displaying F0_S0_Z0_CX1 from the frame buffer of DR0, displaying F0_S1_Z1_CX1 from the line buffer of DR 1.
During displaying F0_S1_Z1_CX1 stored in the line buffer of DR1, storing F0_S1_Z1_CX1 in the frame buffer of DR1, and storing a next scan Line data F0_S1_Z1_CX2 in the line buffer of DR1.
(DR2~DR5 are idle). S007

•
•
•

After the end of displaying F0_S1_Z1_CX177 stored in the line buffer of DR1, repeatedly displaying F0_S0_Z0_CX178 from the frame buffer of DR0, displaying F0_S1_Z1_CX178 from the line buffer of DR 1.
During displaying F0_S1_Z1_CX178 stored in the line buffer of DR1, storing F0_S1_Z1_CX178 in the frame buffer of DR1, and storing a next scan Line data F0_S1_Z1_CX179 (the last data of Zone_1, frame_0) in the line buffer of DR1.
(DR2~DR5 are idle). S008

↓

After the end of displaying F0_S1_Z1_CX178 stored in the line buffer of DR1, repeatedly displaying F0_S0_Z0_CX179 from the frame buffer of DR0, displaying F0_S1_Z1_CX179 from the line buffer of DR 1, and storing F0_S1_Z1_CX179 in the frame buffer of DR1 (all data of Zone_1, frame_0 are stored in the frame buffer of DR1).

DR2 starts receiving F0_S2_Z2_CX0.
(DR3~DR5 are idle). S009

↓

•
•
•

*FIG. 4*

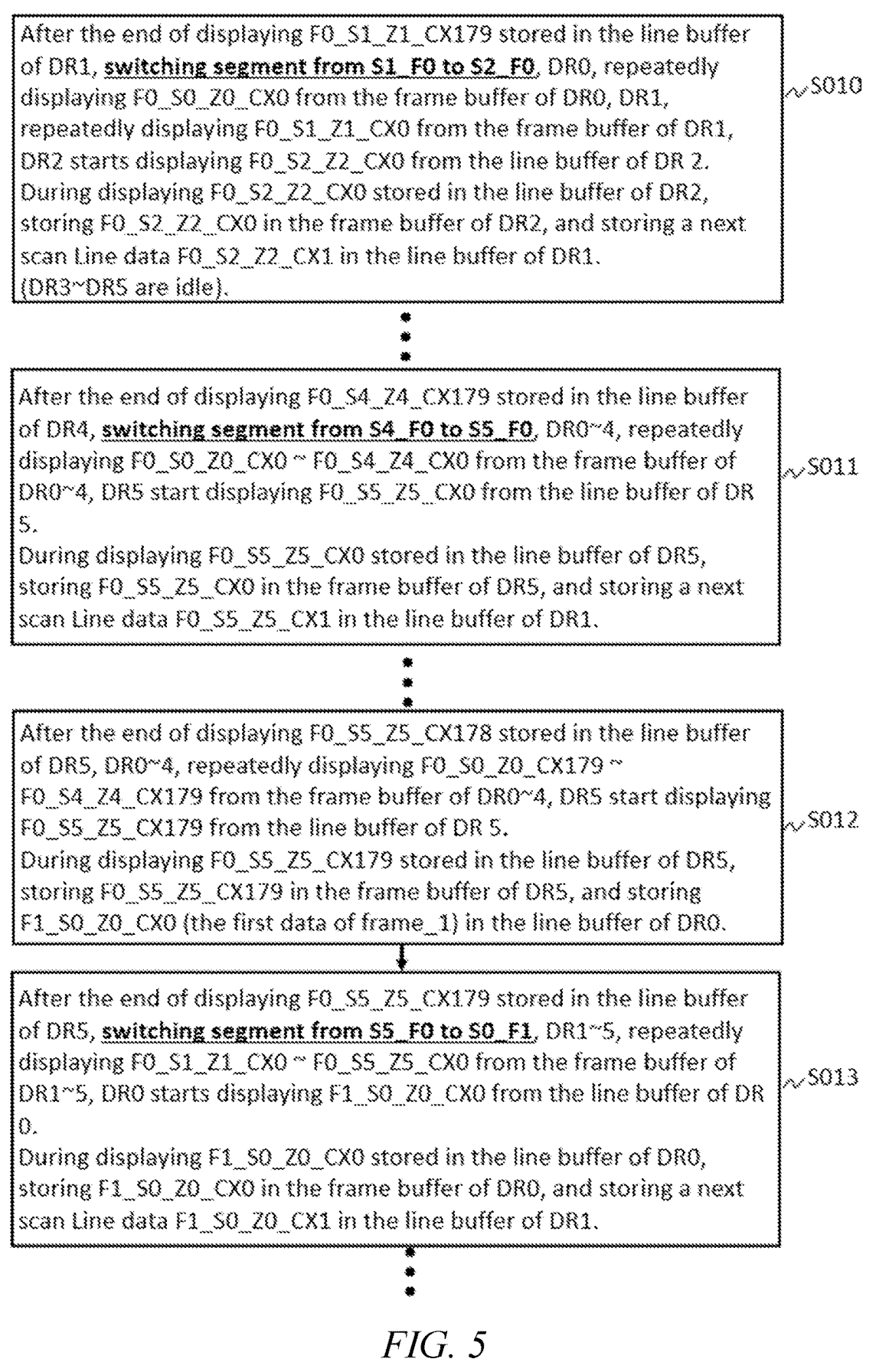

After the end of displaying F0_S1_Z1_CX179 stored in the line buffer of DR1, switching segment from S1_F0 to S2_F0, DR0, repeatedly displaying F0_S0_Z0_CX0 from the frame buffer of DR0, DR1, repeatedly displaying F0_S1_Z1_CX0 from the frame buffer of DR1, DR2 starts displaying F0_S2_Z2_CX0 from the line buffer of DR 2.
During displaying F0_S2_Z2_CX0 stored in the line buffer of DR2, storing F0_S2_Z2_CX0 in the frame buffer of DR2, and storing a next scan Line data F0_S2_Z2_CX1 in the line buffer of DR1.
(DR3~DR5 are idle). S010

⋮

After the end of displaying F0_S4_Z4_CX179 stored in the line buffer of DR4, switching segment from S4_F0 to S5_F0, DR0~4, repeatedly displaying F0_S0_Z0_CX0 ~ F0_S4_Z4_CX0 from the frame buffer of DR0~4, DR5 start displaying F0_S5_Z5_CX0 from the line buffer of DR 5.
During displaying F0_S5_Z5_CX0 stored in the line buffer of DR5, storing F0_S5_Z5_CX0 in the frame buffer of DR5, and storing a next scan Line data F0_S5_Z5_CX1 in the line buffer of DR1. S011

⋮

After the end of displaying F0_S5_Z5_CX178 stored in the line buffer of DR5, DR0~4, repeatedly displaying F0_S0_Z0_CX179 ~ F0_S4_Z4_CX179 from the frame buffer of DR0~4, DR5 start displaying F0_S5_Z5_CX179 from the line buffer of DR 5.
During displaying F0_S5_Z5_CX179 stored in the line buffer of DR5, storing F0_S5_Z5_CX179 in the frame buffer of DR5, and storing F1_S0_Z0_CX0 (the first data of frame_1) in the line buffer of DR0. S012

After the end of displaying F0_S5_Z5_CX179 stored in the line buffer of DR5, switching segment from S5_F0 to S0_F1, DR1~5, repeatedly displaying F0_S1_Z1_CX0 ~ F0_S5_Z5_CX0 from the frame buffer of DR1~5, DR0 starts displaying F1_S0_Z0_CX0 from the line buffer of DR 0.
During displaying F1_S0_Z0_CX0 stored in the line buffer of DR0, storing F1_S0_Z0_CX0 in the frame buffer of DR0, and storing a next scan Line data F1_S0_Z0_CX1 in the line buffer of DR1. S013

⋮

FIG. 5

LIGHT EMITTING DIODE (LED) DISPLAY DRIVER UTILIZING PING PONG LINE BUFFER TO REDUCE HARDWARE COSTS AND LATENCY

CROSS-REFERENCE TO RELATED APPLICATIONS

This application claims the benefit of priority under 35 U.S.C. § 119 to U.S. Provisional Application No. 63/381,856, filed on Nov. 1, 2022, and the entire contents of which are incorporated herein by reference.

BACKGROUND

1. Field of Technology

The present disclosure relates to a Light emitting diode (LED) display method and apparatus for scanning control of an LED driver.

2. Description of Related Art

Since the LED display has a faster response time than a Liquid-crystal display (LCD), the LED display has a flickering issue. In conventional LED driver architectures, one ping-pong frame buffer has been provided in order to reduce the flickering of LED with a higher refresh rate, where the ping-pong frame buffer stores video data so that each scan section can be lit up simultaneously, and each line can be refreshed several times within one frame to reduce or eliminate the flickering of the LED.

However, the ping pong frame buffer adds the cost and may cause further frame delay. In particular, the ping-pong frame buffer SRAM size is proportional (e.g., two times 2×) to the driving pixel number capacity. However, with ping-pong frame buffer, there is a latency of one frame, which cannot be avoided. Accordingly, there is a need for new methods or apparatus that reduce flickering of LED displays.

SUMMARY

This summary is provided to introduce a selection of concepts in a simplified form that are further described below in the detailed description. It is not intended to identify key features or essential features of the claimed subject matter, nor is it intended to be used as an aid in determining the scope of the claimed subject matter.

According to an exemplary embodiment, a method for operating an LED display is provided, which uses a ping-pong line buffer and a single frame buffer to reduce the SRAM hardware cost, for example, by half and the latency, for example, from one frame to one scan line. In particular, the method includes: storing a Nth scan line data in a line buffer, wherein N is a natural number equal or more than one; storing the Nth scan line data in a frame buffer; displaying the Nth scan line data stored in the line buffer; during the displaying of the Nth scan line data stored in the line buffer, storing a (N+1)th scan line data in the line buffer; storing the (N+1)th scan line data in the frame buffer; displaying the (N+1)th scan line data stored in the line buffer; during the displaying of the (N+1)th scan line data stored in the line buffer, storing a (N+2)th scan line data in the line buffer; storing the (N+2)th scan line data in the frame buffer; and displaying the (N+2)th scan line data stored in the line buffer.

Also, in an exemplary embodiment, the method further includes: displaying the Nth scan line data stored in the frame buffer; displaying the (N+1)th scan line data stored in the frame buffer; and displaying the (N+2)th scan line data stored in the frame buffer. Further, the scan line data stored in the frame buffer is sequentially displayed from the Nth scan line data to the (N+2)th scan line data in the same order as being previously displayed from the line buffer. The steps of claim 1 are repeated until (N+M)th scan line data stored in the line buffer is displayed, wherein M is a predetermined natural number more than N. The method further comprises displaying the scan line data stored in the frame buffer from the Nth scan line data to the (N+M)th scan line data, wherein M is a predetermined natural number.

In another exemplary embodiment, the method may include: storing a Nth scan line data in a line buffer, wherein N is a natural number equal or more than one; displaying the Nth scan line data stored in the line buffer; during the displaying of the Nth scan line data stored in the line buffer, storing the Nth scan line data in a frame buffer, and storing a (N+1)th scan line data in the line buffer; displaying the (N+1)th scan line data stored in the line buffer; during the displaying of the (N+1)th scan line data stored in the line buffer, storing the (N+1)th scan line data in the frame buffer, and storing a (N+2) th scan line data in the line buffer; displaying the (N+2)th scan line data stored in the line buffer; and during the displaying of the (N+2)th scan line data stored in the line buffer, storing the (N+2)th scan line data in the frame buffer.

Further, in an exemplary embodiment, the scan line data stored in the frame buffer is sequentially displayed from the Nth scan line data to the (N+M)th scan line data in the same order as being previously displayed from the line buffer. The line buffer is a ping-pong line buffer which is configured to be toggled in each step of storing scan line data. scan line data is stored in the frame buffer from the line buffer. A size of the line buffer is configured to store each scan line data from the Nth scan line data to the (N+M)th scan line data. A size of the frame buffer is configured to store all scan line data from the Nth scan line data to the (N+M)th scan line data.

According to another exemplary embodiment, an apparatus of an LED display is provided. The apparatus includes: a line buffer; a frame buffer; and a processor and a memory device communicatively coupled to the a processor, and the a memory device stores instructions operable when executed by the processor to perform the steps of: storing a Nth scan line data in a line buffer, wherein N is a natural number equal or more than one; storing the Nth scan line data in a frame buffer; displaying the Nth scan line data stored in the line buffer; during the displaying of the Nth scan line data stored in the line buffer, storing a (N+1)th scan line data in the line buffer; storing the (N+1)th scan line data in the frame buffer; displaying the (N+1)th scan line data stored in the line buffer; during the displaying of the (N+1)th scan line data stored in the line buffer, storing a (N+2)th scan line data in the line buffer; storing the (N+2)th scan line data in the frame buffer; and displaying the (N+2)th scan line data stored in the line buffer.

In another exemplary embodiment, the a memory device may store instructions operable when executed by the processor to perform the steps of: storing a Nth scan line data in a line buffer, wherein N is a natural number equal or more than one; displaying the Nth scan line data stored in the line buffer; during the displaying of the Nth scan line data stored in the line buffer, storing the Nth scan line data in a frame buffer, and storing a (N+1)th scan line data in the line buffer;

displaying the (N+1)th scan line data stored in the line buffer; during the displaying of the (N+1)th scan line data stored in the line buffer, storing the (N+1)th scan line data in the frame buffer, and storing a (N+2) th scan line data in the line buffer; displaying the (N+2)th scan line data stored in the line buffer; and during the displaying of the (N+2)th scan line data stored in the line buffer, storing the (N+2)th scan line data in the frame buffer.

Also, in an exemplary embodiment, the memory device stores instructions operable when executed by the processor to further perform the steps of: displaying the Nth scan line data stored in the frame buffer; displaying the (N+1)th scan line data stored in the frame buffer; and displaying the (N+2)th scan line data stored in the frame buffer. The scan line data stored in the frame buffer is sequentially displayed, by the processor, from the Nth scan line data to the (N+2)th scan line data in the same order as being previously displayed from the line buffer. The memory device stores instructions operable when executed by the processor to repeat the steps of claim 1 until (N+M)th scan line data stored in the line buffer is displayed, wherein M is a predetermined natural number more than N. The memory device stores instructions operable when executed by the processor to further perform displaying the scan line data stored in the frame buffer from the Nth scan line data to the (N+M)th scan line data, wherein M is a predetermined natural number.

Further, in an exemplary embodiment, the scan line data stored in the frame buffer is sequentially displayed, by the processor, from the Nth scan line data to the (N+M)th scan line data in the same order as being previously displayed from the line buffer. The line buffer is a ping-pong line buffer which is configured to be toggled in each step of storing scan line data. scan line data is stored in the frame buffer from the line buffer. A size of the line buffer is configured to store each scan line data from the Nth scan line data to the (N+M)th scan line data. A size of the frame buffer is configured to store all scan line data from the Nth scan line data to the (N+M)th scan line data.

BRIEF DESCRIPTION OF THE DRAWINGS

Advantages of embodiments of the present invention will be apparent from the following detailed description of the exemplary embodiments thereof, which description should be considered in conjunction with the following drawings.

FIG. 4 is a diagram depicting the segment transactions in subframe S1_F0 according to an exemplary embodiment.

FIG. 5 is a diagram depicting the segment transactions in subframe S2_F0 to S5_F0 and further to S0_F1 according to an exemplary embodiment.

DETAILED DESCRIPTION OF EXEMPLARY EMBODIMENT

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both.

Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

According to an exemplary embodiment, and referring generally to the Figures, various exemplary implementations of a scrambled progressive scan architecture for an LED driver may be disclosed. According to an exemplary embodiment, the scrambled progressive scan architecture for the LED driver may use a ping-pong line buffer and a single frame buffer, which reduces the SRAM hardware cost, for example, by half. Such an architecture can be beneficial for fine pitch or mini/micro LED driver, which requires a large driving pixel capacity become bigger and bigger. Also, in an exemplary embodiment, using ping-pong line buffer instead of the frame buffer can reduce the latency, for example, from one frame to one scan line.

Figure 1:
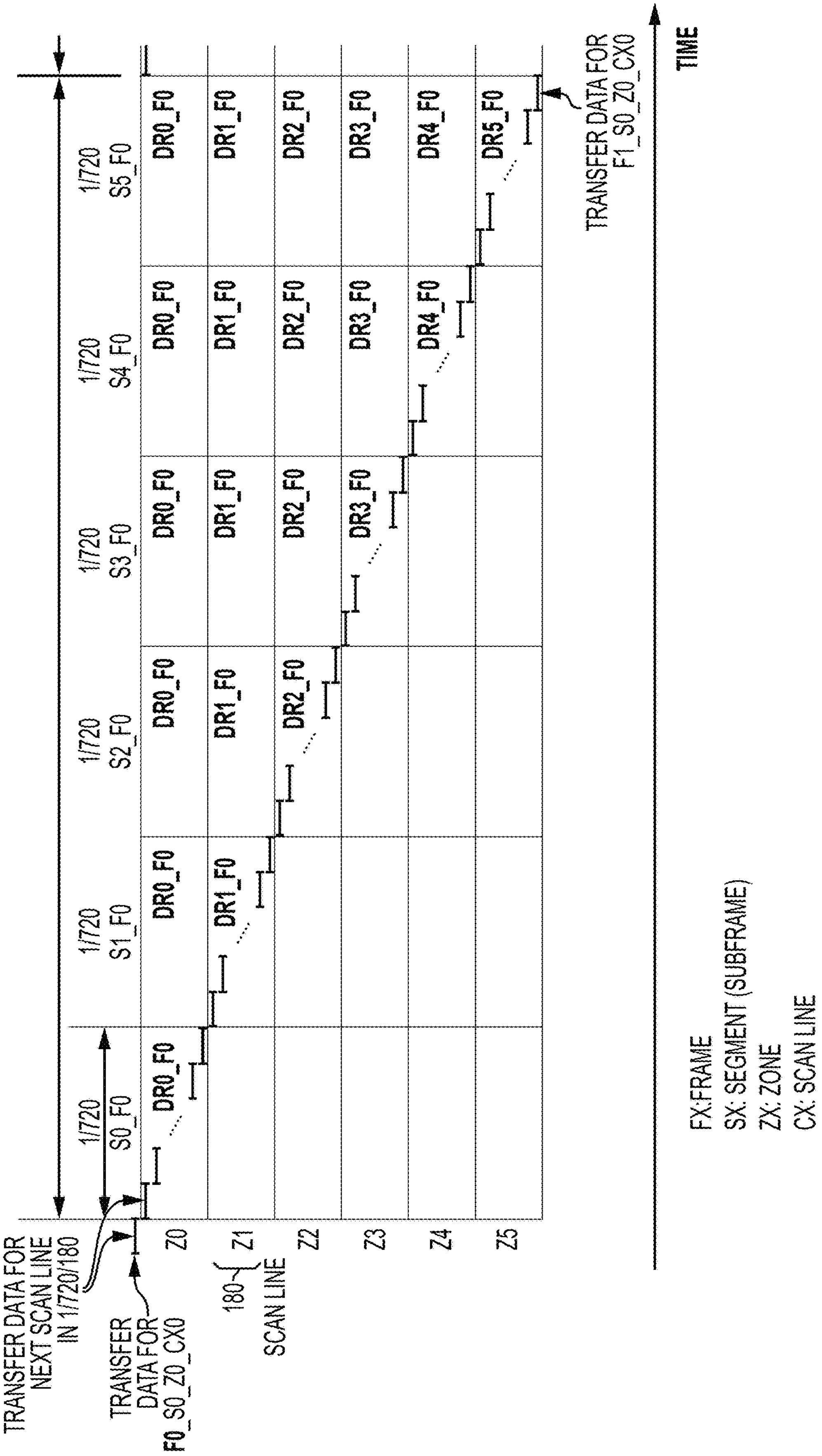
FIG. 1 is a diagram depicting data transfer sequence in an LED display in an exemplary embodiment.

Turning now to FIG. 1, FIG. 1 is a diagram depicting data transfer sequence in an LED display in an exemplary embodiment. According to the exemplary embodiment, the LED display may include six zones, and each zone having 180 scan lines as below:

- DR0 is all LED drivers driving LEDs in Zone0, SCAN Lines 0-179.
- DR1 is all LED drivers driving LEDs Zone1, SCAN Lines 180-359.
- DR2 is all LED drivers driving LEDs Zone2, SCAN Lines 360-539.
- DR3 is all LED drivers driving LEDs Zone3, SCAN Lines 540-719.
- DR4 is all LED drivers driving LEDs Zone4, SCAN Lines 720-899.
- DR5 is all LED drivers driving LEDs Zone5, SCAN Lines 900-1079.

In an exemplary embodiment, each frame period may be divided into S segments (sub frames) and each segment has time period (Tsubframe) about 1/frame/S, which may increase the refresh rate from Frame_rate to Frame_rate*S. In the case of a 120 Hz frame rate and 6 segments, the refresh rate may be 1/120/6*le3=1.3889 ms. Also, in an exemplary embodiment, each subframe may be divided into Z number of zones vertically. Each zone has a scan zone number of scan_line, which equals to Total_SCAN/Z. For example, in a 1K LED display panel of 1920 (channels)× 1080 (scan lines) that is divided into 6 zones, each zone has scan zone=1080/6=180 scan lines. In case of a vertical scan case, the total number of pixels in each zone is 1920(H)× 180(V). H stands for horizontal while V stands for vertical.

Further, according to an exemplary embodiment, each zone may be controlled by multiple LED drivers working together to enable the full horizontal range. For example, for an LED driver driving 60 (channel)×180 (scan) pixels case, each zone requires 1920/60=32 drivers. In the case of a 120 Hz frame rate and 6 segments or subframes. Its scan display period is subframe period/scan zone=1/(120×6)/180=1.3889 ms/180=7.716 us. In an exemplary embodiment, the segment of frame is represented in the format of "S(egment)_F(rame)". Thus, the segments of frame_0 is "S0_F0-S5_F0" while "S0_F1-S5_F1" is the segments of frame_1. Also, in an exemplary embodiment, the data is represented as the format of "F(rame)_S(egment)_Z(one)_CX(scan)". For example, "F0_S0_Z0_CX0" is the data for Frame_0, Segment_0, Zone_0 and SCAN_line_0. New scan line data is transferred and stored into ping-pong line buffer during when the proceeding scanline is being displayed.

According to an exemplary embodiment, when the proceeding scan line is completely displayed and the scan line change signal trigged, LED driver toggle the ping-pong line buffer and displays the new scan line data. The new scan line data is stored into frame buffer. In an exemplary embodiment, toggling the ping-pong line buffer and storing into frame buffer do not need to be performed simultaneously. According to an exemplary embodiment, new scan line data can be stored into the frame buffer as long as the line buffer has been updated. However, having both occurring at the same time affords better timing control.

Figure 2:
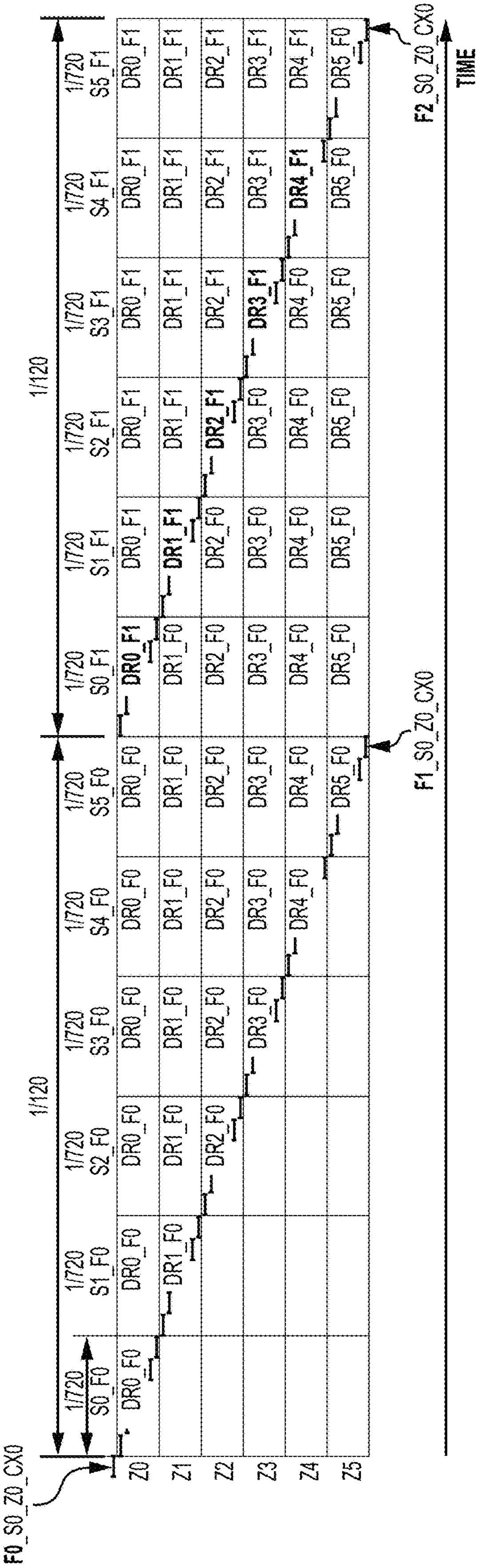
FIG. 2 is a diagram depicting the data transfer sequence in subframe S0_F0 to S5_F0 and further to S0_F1 according to an exemplary embodiment.

Turning now to FIG. 2, FIG. 2 is a diagram depicting the transactions in subframe S0_F0 to S5_F0 and further to S0_F1. According to an exemplary embodiment, each LED driver has a ping-pong line buffer to store the current scan line data and the data for next scan line. Also, in an exemplary embodiment, a single frame buffer may be used to display the same or similar content in following segments (subframe). After the line buffer is filled, it may wait for change scan line signal to switch the scan line display content and at the same time store the data into the frame buffer.

According to an exemplary embodiment, displaying the current scan line data and storing the current scan line data into the frame buffer may occur at the same time. Accordingly, in each scan period, the LED driver may display the current scan line data and receive the next scan line data in the line buffer. Once the change scan line signal is received, the driver may swap the ping-pong line buffer to change the display content and store the content into the frame buffer. after all scan lines in each zone have been displayed within a segment (subframe), the Zone data of all scan lines may already be stored in the frame buffer, and the stored data may be used to display in the following segments.

Referring still to FIG. 2, according to an exemplary embodiment, data of DR0 may be transferred and stored into frame buffer during S0_FN and be displayed repeatedly in S1_FN-S5_FN. Data of DR1 may be transferred and stored into frame buffer during S1_FN and be displayed repeatedly in S2_FN-S5_FN, S0_FN+1. Data of DR2 may be transferred and stored into frame buffer during S2_FN and be displayed repeatedly in S3_FN-S5_FN, S0_FN+1-S1_FN+1. Data of DR3 may be transferred and stored into frame buffer during S3_FN and be displayed repeatedly in S4_FN-S5_FN, S0_FN+1-S2_FN+1. Data of DR4 data may be transferred and stored into frame buffer during S4_FN and be displayed repeatedly in S5_FN, S0_FN+1-S3_FN+1. Data of DR5 data may be transferred and stored into frame buffer during S5_FN and be displayed repeatedly in S0_FN+1-S4_FN+1.

According to an exemplary embodiment, all Frame_N data may be transferred into LED driver from the start to the end of Frame_N, but the display may start from Frame_N and end within Frame_N+1. The latency of the exemplary embodiment can be only "one scan line" comparing with the conventional architecture which generally has one frame delay.

Figure 3:
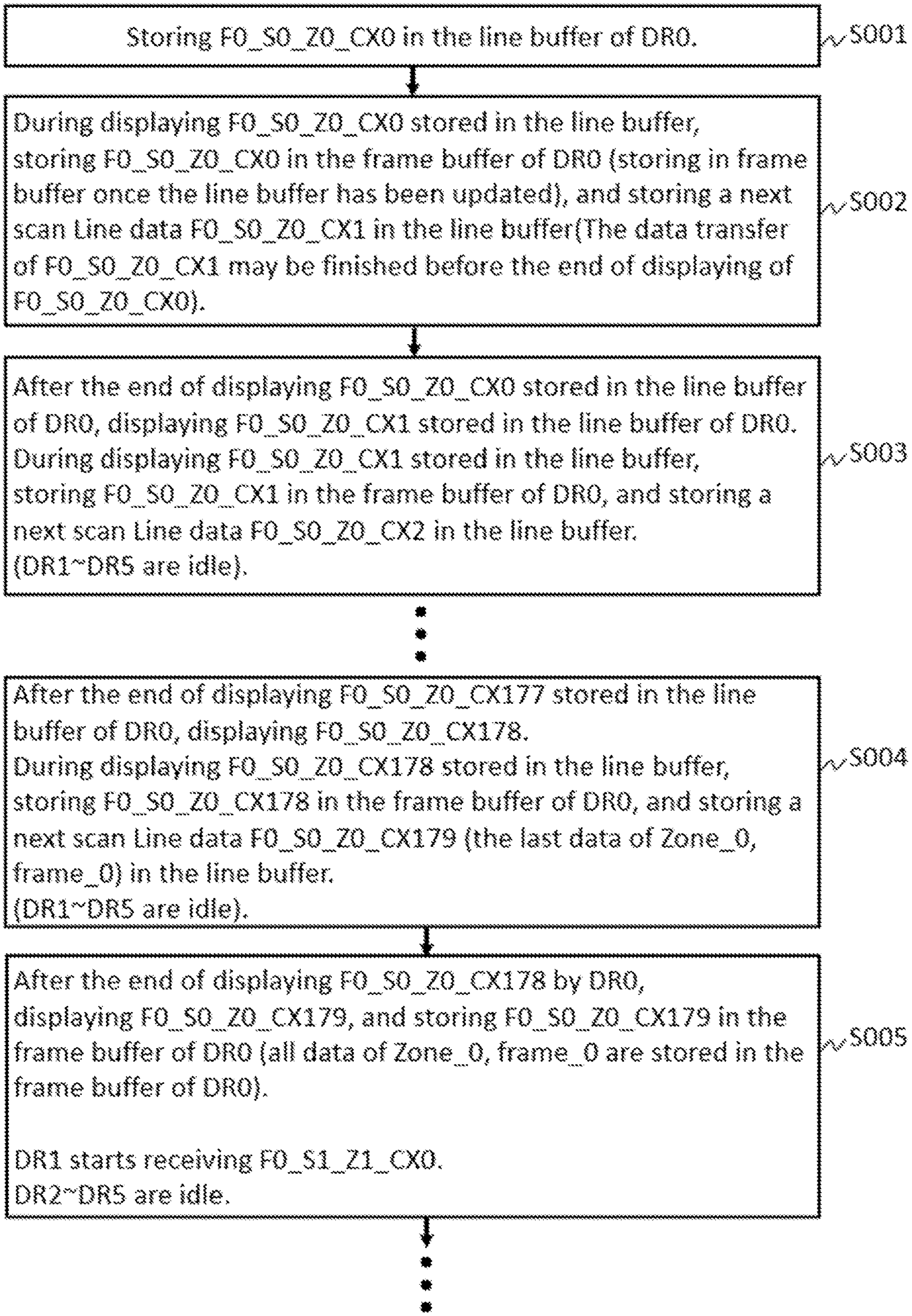
FIG. 3 is a diagram depicting segment transactions in subframe S0_F0 according to an exemplary embodiment.

Turning now to FIGS. 3-5, the aforementioned segment transactions in subframe S0_F0 to S5_F0 and further to S0_F1 are further described in more detail along with FIGS. 3-5. According to an exemplary embodiment, referring to FIG. 3, the segment transaction of subframe S0_F0 may be initiated by storing F0_S0_Z0_CX0 in the line buffer of DR0. (S001). During displaying F0_S0_Z0_CX0 stored in the line buffer, the transaction further proceed with storing F0_S0_Z0_CX0 in the frame buffer of DR0 (storing in frame buffer once the line buffer has been updated), and storing a next scan line data F0_S0_Z0_CX1 in the line buffer(data transfer of F0_S0_Z0_CX1 may be finished before the end of displaying of F0_S0_Z0_CX0). (S002). After displaying F0_S0_Z0_CX0 stored in the line buffer of DR0, the transaction further proceeds with displaying F0_S0_Z0_CX1 stored in the line buffer of DR0. During displaying F0_S0_Z0_CX1 stored in the line buffer, the transaction further proceeds with storing F0_S0_Z0_CX1 in the frame buffer of DR0 and storing a next scan line data F0_S0_Z0_CX2 in the line buffer. According to an exemplary embodiment, DR1-DR5 are idle. (S003). The foregoing steps are repeated until F0_S0_Z0_CX177 stored in the line buffer of DR0 is displayed. At the end of displaying F0_S0_Z0_CX177 stored in the line buffer of DR0, the transaction proceeds with displaying F0_S0_Z0_CX178. During displaying F0_S0_Z0_CX178 stored in the line buffer, the transaction proceeds with storing F0_S0_Z0_CX178 in the frame buffer of DR0 and storing a next scan line data F0_S0_Z0_CX179 (the last data of Zone_0, frame_0) in the line buffer. DR1-DR5 are still idle. (S004). At the end of displaying F0_S0_Z0_CX178 by DR0, the transaction proceeds with displaying F0_S0_Z0_CX179 and storing F0_S0_Z0_CX179 in the frame buffer of DR0. According to an exemplary embodiment, all data of Zone_0, frame_0 are supposed to be stored in the frame buffer of DR0 at this point. DR1 starts receiving F0_S1_Z1_CX0. DR2-DR5 are idle. (S005).

Referring now to FIG. 4, the segment transaction is now switched from subframe S0_F0 to S1_F0. At the end of displaying F0_S0_Z0_CX179 stored in the line buffer of DR0, the transaction proceeds with repeatedly displaying F0_S0_Z0_CX0 from the frame buffer of DR0, DR1 starts displaying F0_S1_Z1_CX0 from the line buffer of DR 1. During displaying F0_S1_Z1_CX0 stored in the line buffer of DR1, the transaction proceeds with storing F0_S1_Z1_CX0 in the frame buffer of DR1 and storing a next scan line data F0_S1_Z1_CX1 in the line buffer of DR1. DR2-DR5 are idle. (S006). At the end of displaying F0_S1_Z1_CX0 stored in the line buffer of DR1, the transaction proceeds with repeatedly displaying F0_S0_Z0_CX1 from the frame buffer of DR0 and displaying F0_S1_Z1_CX1 from the line buffer of DR 1. During displaying F0_S1_Z1_CX1 stored in the line buffer of DR1, the transaction proceeds with storing F0_S1_Z1_CX1 in the frame buffer of DR1 and storing a next scan line data F0_S1_Z1_CX2 in the line buffer of DR1. DR2-DR5 are idle. (S007). The foregoing steps are repeated until displaying F0_S1_Z1_CX177 stored in the line buffer of DR1. After the end of displaying F0_S1_Z1_CX177 stored in the line buffer of DR1, the transaction proceeds with repeatedly displaying F0_S0_Z0_CX178 from the frame buffer of DR0 and displaying F0_S1_Z1_CX178 from the line buffer of DR 1. During displaying F0_S1_Z1_CX178 stored in the line buffer of DR1, the transaction proceeds with storing F0_S1_Z1_CX178 in the frame buffer of DR1 and storing a next scan line data F0_S1_Z1_CX179 (the last data of Zone_1, frame_0) in the line buffer of DR1. DR2-DR5 are still idle. (S008). At the end of displaying F0_S1_Z1_CX178 stored in the line buffer of DR1, the transaction proceeds with repeatedly displaying F0_S0_Z0_CX179 from the frame buffer of DR0, displaying F0_S1_Z1_CX179 from the line buffer of DR 1, and storing F0_S1_Z1_CX179 in the frame buffer of DR1. All data of Zone_1, frame_0 are stored in the frame buffer of DR1 at this point, and DR2 starts receiving F0_S2_Z2_CX0. DR3-DR5 are idle. (S009).

Referring now to FIG. 5, the segment transaction is now switched from subframe S1_F0 to S2_F0. After the end of displaying F0_S1_Z1_CX179 stored in the line buffer of DR1, the transaction proceeds with repeatedly displaying F0_S0_Z0_CX0 from the frame buffer of DR0 and repeatedly displaying F0_S1_Z1_CX0 from the frame buffer of DR1. DR2 starts displaying F0_S2_Z2_CX0 from the line buffer of DR 2. During displaying F0_S2_Z2_CX0 stored in the line buffer of DR2, the transaction proceeds with storing F0_S2_Z2_CX0 in the frame buffer of DR2 and storing a next scan line data F0_S2_Z2_CX1 in the line buffer of DR1. DR3-DR5 are idle at this point. (S010). The similar steps are repeated until displaying F0_S4_Z4_CX179 stored in the line buffer of DR4, and the segment transaction is switched from subframe S4_F0 to S5_F0. After the end of displaying F0_S4_Z4_CX179 stored in the line buffer of DR4, the transaction proceeds with repeatedly displaying F0_S0_Z0_CX0-F0_S4_Z4_CX0 from the frame buffer of DR0-4. DR5 start displaying F0_S5_Z5_CX0 from the line buffer of DR 5. During displaying F0_S5_Z5_CX0 stored in the line buffer of DR5, the transaction proceeds with storing F0_S5_Z5_CX0 in the frame buffer of DR5 and storing a next scan line data F0_S5_Z5_CX1 in the line buffer of DR1. (S011). The similar steps are repeated until displaying F0_S5_Z5_CX178 stored in the line buffer of DR5. After the end of displaying F0_S5_Z5_CX178 stored in the line buffer of DR5, the transaction proceeds with repeatedly displaying F0_S0_Z0_CX179-F0_S4_Z4_CX179 from the frame buffer of DR0-4. DR5 start displaying F0_S5_Z5_CX179 from the line buffer of DR 5. During displaying F0_S5_Z5_CX179 stored in the line buffer of DR5, the transaction proceeds with storing F0_S5_Z5_CX179 in the frame buffer of DR5 and storing F1_S0_Z0_CX0 (the first data of frame_1) in the line buffer of DR0. (S012). The segment transaction is now switched from subframe S5_F0 to S0_F1. After the end of displaying F0_S5_Z5_CX179 stored in the line buffer of DR5, the transaction proceeds with repeatedly displaying F0_S1_Z1_CX0-F0_S5_Z5_CX0 from the frame buffer of DR1-5. DR0 starts displaying F1_S0_Z0_CX0 from the line buffer of DR 0. During displaying F1_S0_Z0_CX0 stored in the line buffer of DR0, the transaction proceeds with storing F1_S0_Z0_CX0 in the frame buffer of DR0 and storing a next scan line data F1_S0_Z0_CX1 in the line buffer of DR1.

Figure 6:
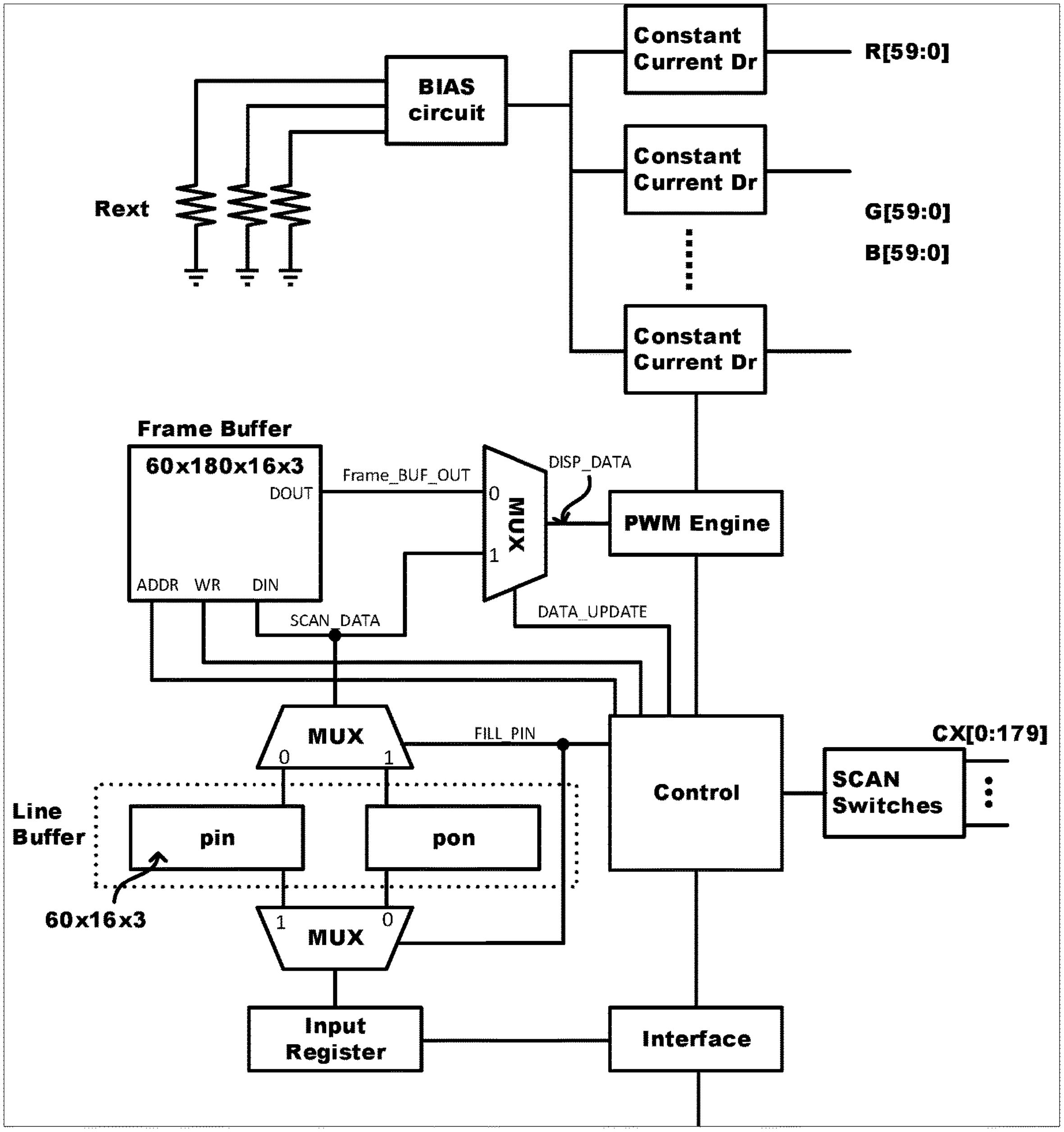
FIG. 6 is a block diagram showing components in a driver of an exemplary embodiment.
Figure 7:
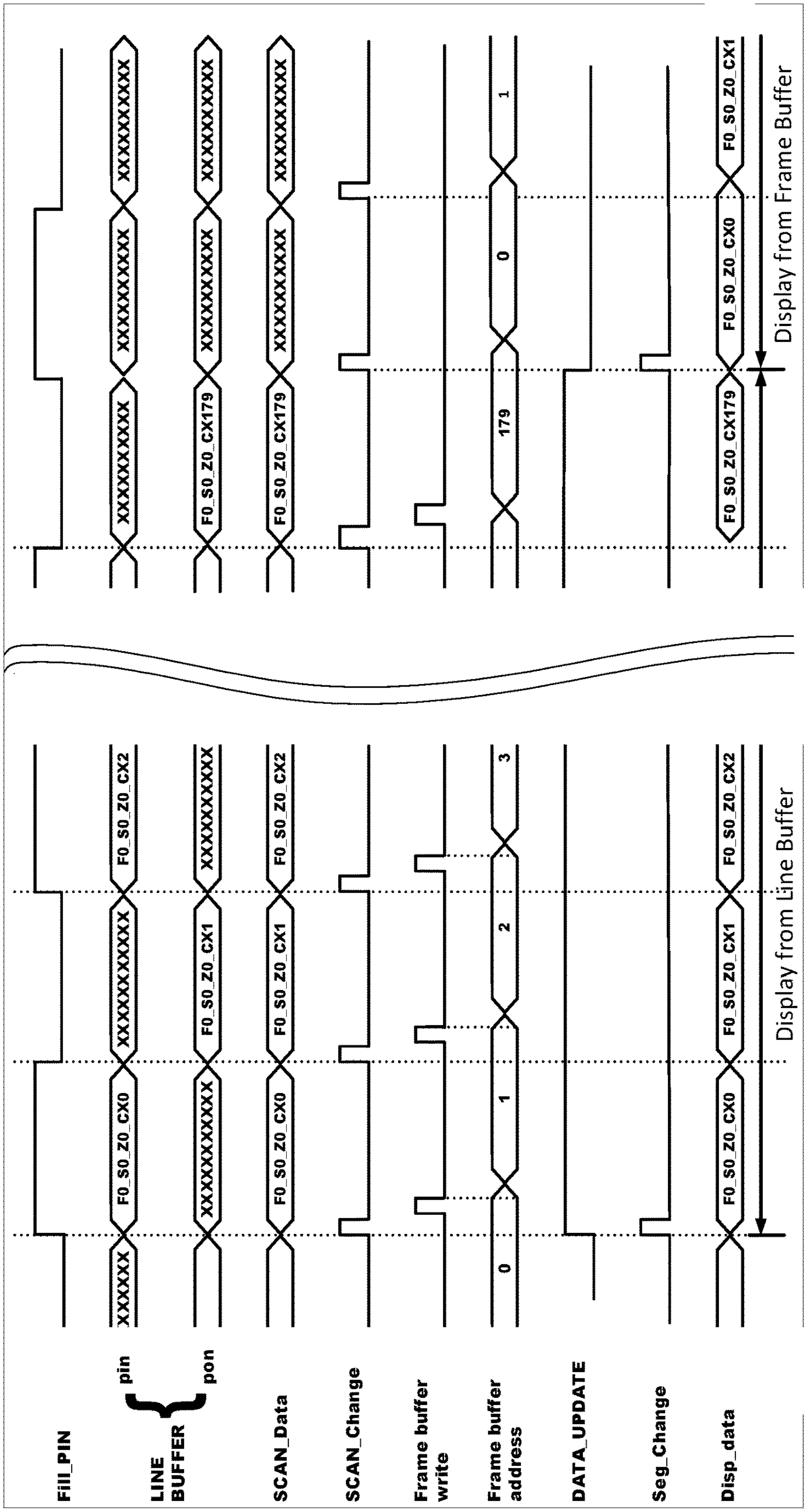
FIG. 7 is the timing diagram of a driving scheme according to an exemplary embodiment.

Turning now to FIGS. 6 and 7, FIG. 6 is a block diagram showing components in a driver of an exemplary embodiment which provides, as an example, a 16 bits gray scale LED driver that drives 60×180 pixels. FIG. 7 is the timing diagram of the driving scheme according to an exemplary embodiment. As shown in the figures, SCAN_Change strobe may trigger the SCAN Line content change. It also may trigger the FILL_PIN signal for the line buffer. The ping-pong line buffer operation is defined by FILL_PIN. When FILL_PIN=1, ping memory is updating and pong memory drives SCAN_DATA. When FILL_PIN=0, PING memory drives SCAN_DATA while PONG memory drive SCAN_DATA. Meanwhile, Frame_Buffer_Write strobe presents after SCAN_Change strobe. It triggers the writing SCAN_DATA into frame buffer. The input to PWM Engine comes from when DATA_UPDATE=1: SCAN_DATA; when DATA_UPDATE=0: Frame_BUF_OUT. The PWM Engine calculates the PWM pulse and shift into output channels.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

We claim:

1. A method for operating a Light Emitting Diode (LED) display, comprising:

Step A: storing a Nth scan line data in at least one line buffer, wherein N is a natural number equal to or more than one;

Step B: displaying the Nth scan line data stored in the at least one line buffer, and simultaneously storing the Nth scan line data in at least one frame buffer, and storing a (N+1)th scan line data in the at least one line buffer;

Step C: displaying the (N+1)th scan line data stored in the at least one line buffer, and simultaneously storing the (N+1)th scan line data in the at least one frame buffer, and storing a (N+2)th scan line data in the at least one line buffer;

Step D: displaying the (N+2)th scan line data stored in the at least one line buffer, and simultaneously storing the (N+2)th scan line data in the at least one frame buffer;

Step E: repeating Step A to Step D until (N+M)th scan line data stored in the at least one line buffer is displayed, wherein M is a predetermined natural number more than N; and Step G: displaying the scan line data stored in the at least one frame buffer from the Nth scan line data to the (N+M)th scan line data, wherein the scan line data stored in the at least one frame buffer is sequentially displayed from the Nth scan line data to the (N+M)th scan line data in a same order as being previously displayed from the at least one line buffer.

2. The method according to claim 1, wherein the at least one line buffer is a ping-pong line buffer which is configured to be toggled in each step of storing at least one scan line data.

3. The method according to claim 1, wherein at least one scan line data is stored in the at least one frame buffer from the at least one line buffer.

4. The method according to claim 1, wherein a size of the at least one line buffer is configured to store each scan line data from the Nth scan line data to the (N+M)th scan line data.

5. The method according to claim 1, wherein a size of the at least one frame buffer is configured to store all scan line data from the Nth scan line data to the (N+M)th scan line data.

6. An apparatus for operating a Light Emitting Diode (LED) display, comprising:

at least one line buffer;

at least one frame buffer; and at least one processor and at least one memory device communicatively coupled to the at least one processor, and the at least one memory device stores instructions operable when executed by the at least one processor to perform steps of:

storing a Nth scan line data in at least one line buffer, wherein N is a natural number equal to or more than one;

displaying the Nth scan line data stored in the at least one line buffer, and simultaneously storing the Nth scan line data in at least one frame buffer, and storing a (N+1)th scan line data in the at least one line buffer;

displaying the (N+1)th scan line data stored in the at least one line buffer, and simultaneously storing the (N+1)th scan line data in the at least one frame buffer, and storing a (N+2)th scan line data in the at least one line buffer; and displaying the (N+2)th scan line data stored in the at least one line buffer, and storing the (N+2)th scan line data in the at least one frame buffer, wherein the at least one memory device stores instructions operable when executed by the at least one processor to repeat the aforementioned steps until (N+M)th scan line data stored in the at least one line buffer is displayed, wherein M is a predetermined natural number more than N, wherein the at least one memory device stores instructions operable when executed by the at least one processor to further perform displaying the scan line data stored in the at least one frame buffer from the Nth scan line data to the (N+M)th scan line data, and wherein the scan line data stored in the at least one frame buffer is sequentially displayed, by the at least one processor, from the Nth scan line data to the (N+M)th scan line data in a same order as being previously displayed from the at least one line buffer.

7. The apparatus according to claim 6, wherein the at least one line buffer is a ping-pong line buffer which is configured to be toggled in each step of storing at least one scan line data.

8. The apparatus according to claim 6, wherein at least one scan line data is stored in the at least one frame buffer from the at least one line buffer.

9. The apparatus according to claim 6, wherein a size of the at least one line buffer is configured to store each scan line data from the Nth scan line data to the (N+M)th scan line data.

10. The apparatus according to claim 6, wherein a size of the at least one frame buffer is configured to store all scan line data from the Nth scan line data to the (N+M)th scan line data.

* * * * *